United States Patent
Lee et al.

(10) Patent No.: US 8,310,337 B2
(45) Date of Patent: Nov. 13, 2012

(54) STATE SENSING FOR A REMOTE CONTROL

(75) Inventors: Noel Lee, Las Vegas, NV (US); Anthony Di Chiro, Chatsworth, CA (US); Demain Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 962 days.

(21) Appl. No.: 11/970,455

(22) Filed: Jan. 7, 2008

(65) Prior Publication Data

US 2009/0128361 A1     May 21, 2009

Related U.S. Application Data

(60) Provisional application No. 60/883,728, filed on Jan. 5, 2007.

(51) Int. Cl.
*G05B 23/02* (2006.01)

(52) U.S. Cl. ...... 340/3.7; 340/3.1; 340/3.71; 348/14.05; 398/107; 725/38; 725/40; 725/49

(58) Field of Classification Search ............ 340/825.69, 340/825.72, 3.1, 3.7, 3.71, 12.22, 12.5, 13.24; 348/14.05; 398/107; 725/38, 40, 49
See application file for complete search history.

(56) References Cited

U.S. PATENT DOCUMENTS

| | | | | |
|---|---|---|---|---|
| 5,815,086 A * | 9/1998 | Ivie et al. | | 340/12.52 |
| 6,784,801 B2 * | 8/2004 | Watanabe et al. | | 340/679 |
| 6,956,461 B2 * | 10/2005 | Yoon et al. | | 340/12.52 |
| 7,533,167 B2 * | 5/2009 | Motoyama et al. | | 709/224 |
| 7,681,194 B2 * | 3/2010 | Van Ee et al. | | 718/100 |
| 2003/0106062 A1 * | 6/2003 | Shteyn et al. | | 725/78 |
| 2003/0234737 A1 * | 12/2003 | Nelson et al. | | 341/176 |
| 2004/0148632 A1 * | 7/2004 | Park et al. | | 725/81 |
| 2004/0214617 A1 * | 10/2004 | Kanazawa et al. | | 455/574 |
| 2004/0266419 A1 * | 12/2004 | Arling et al. | | 455/420 |
| 2005/0073518 A1 * | 4/2005 | Bontempi | | 345/211 |
| 2006/0077174 A1 * | 4/2006 | Chung et al. | | 345/156 |
| 2006/0140374 A1 * | 6/2006 | Light et al. | | 379/201.01 |
| 2006/0161865 A1 * | 7/2006 | Scott et al. | | 715/810 |
| 2006/0290465 A1 * | 12/2006 | Go et al. | | 340/3.7 |
| 2007/0136768 A1 * | 6/2007 | Kumar | | 725/81 |

\* cited by examiner

*Primary Examiner* — Jennifer Mehmood
*Assistant Examiner* — Andrew Bee
(74) *Attorney, Agent, or Firm* — LaRiviere, Grubman & Payne, LLP

(57) ABSTRACT

An apparatus, method and system for state or status sensing of devices for a remote control or remote controlled system. The devices status indicator system 101 comprises a hand held remote control device 109, device status indicator 104, 106, 107, and device 103, 111, 112. In the alternative, a smart control device 110 can be used with or without a hand held remote control device 109. When the device 103, 111, 112 is turned ON or OFF in the remote controlled system, the device status indicator 104, 106, 107 will send a signal 102, 105, 108 to the remote control device 109 and/or the smart control device 110. This signal 102, 105, 108 triggers information to be stored in the remote control device 109 and/or the smart control device 110 that indicates that the device 103, 111, 112 is in an ON or OFF state.

10 Claims, 3 Drawing Sheets

STATE SENSING FOR A REMOTE CONTROL

PRIORITY CLAIM

This application claims the benefit of U.S. Provisional Application No. 60/883,728, filed on Jan. 5, 2007, under 35 U.S.C. 119(e).

TECHNICAL FIELD

The present invention relates to state or status sensing of devices for a remote control or remote controlled system. More particularly, the present invention relates to state or status sensing of devices in a remote controlled audio video system environment, home automation system or audio-video home distribution system.

BACKGROUND ART

Present remote control systems do not have a method or apparatus to tell if a device is in an operating mode or not. Currently, most remote control systems use a toggle switch on the device for turning the device off rather than turning the device off with the off button on the remote control or remote control system. This leaves the remote control system effectively in an operating state when it is off, thereby rendering the device uncontrollable from a remote control. As a result, there is a need for a system, method and apparatus which can sense the state or status of a device and indicate it to a remote control or remote control system. Further, in other systems a state memory can fail if the status of the device is changed and the state memory is not aware of the change. The present invention is capable of storing the status mode of a device as well as tracking previous states and actions to determine specific sets of actions to cause a specific result. This reduces the dependency on state memory.

DISCLOSURE OF INVENTION

The present invention solves a difficult condition of indicating the status or state of devices in a remote control or remote controlled system. More particularly, a device status indicator for a remote controlled audio video system environment, home automation system or an audio-video home distribution system. The present invention allows a remote control system to know absolutely if a device is in an operating mode.

The device status indicator system allows a person to simply walk up to a DVD player, insert a disc, push the play button and the device indicator system will automatically transmit information into the remote control system to turn on everything in the system to accomplish this and keep track of it.

The device status indicator system may be comprised of hardware that is wired in series. The signals from the devices can output a signal that the remote control system can read. The device status indicator is equipped with a male and female connector that is the same as the device for which the status is being sensed. This allows for simple installation of the device status indicator system. The device status indicator is equipped with an electronic circuit that will differentiate between an output signal and no output signal, thereafter, transmitting this information to the remote control system. In one embodiment, the communication will be by a wired connection. In an alternative embodiment, the communication will be through wireless technology, for example Z-wave or WiFi, but not limited to.

The device status indicator software in the remote control system will keep track of the state of all the device status indicators in the system. One embodiment of the software, operates to monitor the state of all the device status indicators in the system to keep all the devices in the system in sync with the remote control system. If the software finds a device that is out of sync, it can automatically correct the device state. An example of a type of monitoring could be polling.

With the device status indicator system the remote controlled system can keep track of many complicated system functions. In one embodiment, the system functions are automated as a result of this tracking. This can relate to any function requiring a mechanical input to the system.

BRIEF DESCRIPTION OF DRAWINGS

For fuller understanding of the present invention, reference is made to the accompanying drawings numbered below. Commonly used reference numbers identify the same or equivalent parts of the claimed invention throughout the several figures.

Additionally, the embodiments may include wherein the remote control device includes a display screen suitable for displaying images and text, and wherein the signal indicating the operating mode status of at least one or more of the devices is converted to text and displayed on the display screen.

The invention could also include a device status indicator for sensing the state of a device, comprising a communication interface for receiving signals from at least one or more devices; a program for processing the received signal into instructions; a communication interface for sending the processed signal instructions to a remote control device; and a memory arranged to store data. Additionally, the device could also include wherein the processed signal instructions are the operating mode status of at least one or more of the devices.

The invention could also include a remote control device for sensing the state of a device, comprising a communication interface for receiving and transmitting signals to and from a device status indicator; a processor for processing executable instructions; and a program for generating a command to at least one or more of the devices to change their operating mode status.

BEST MODE FOR CARRYING OUT THE INVENTION

Figure 1:
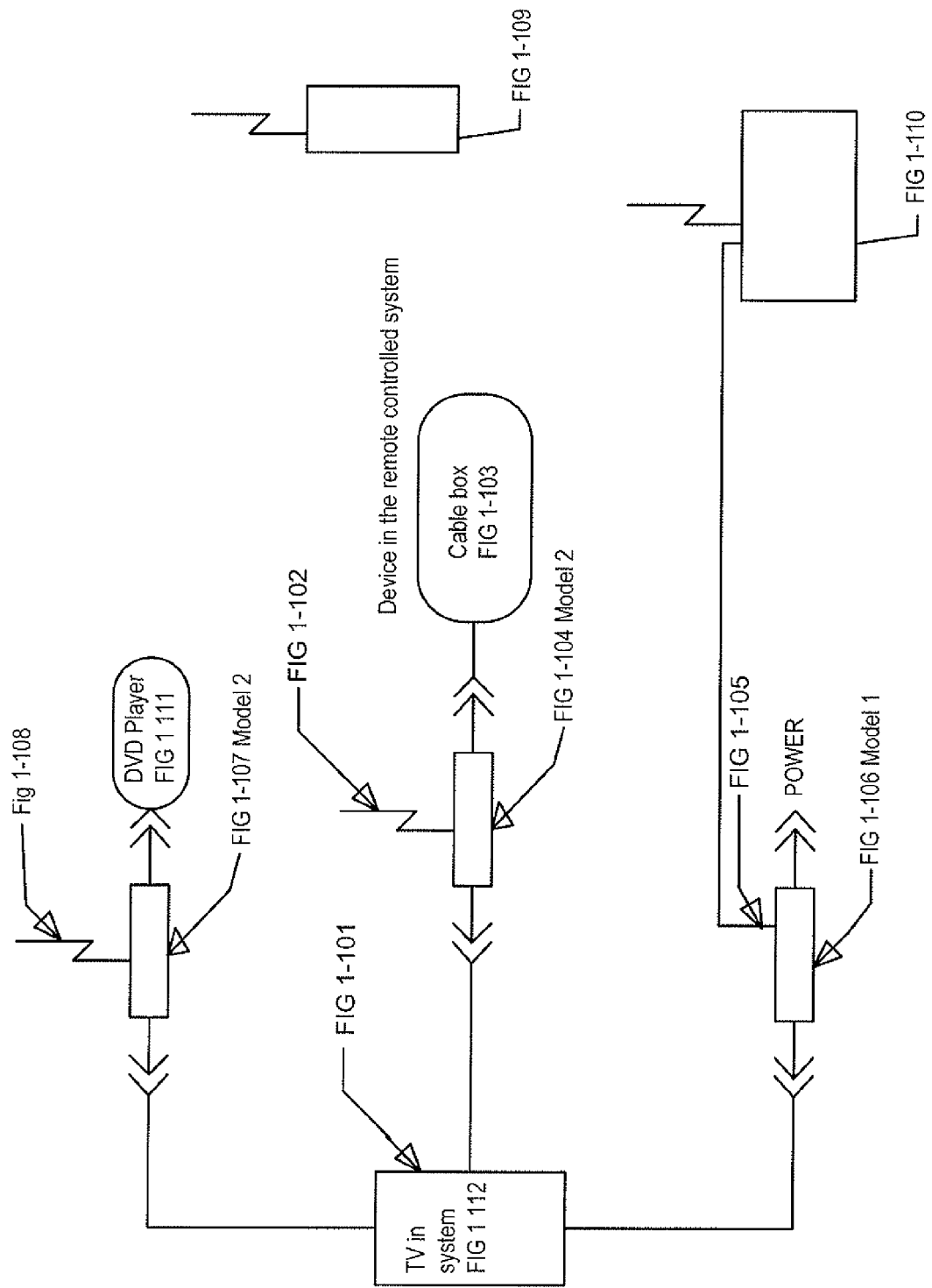
FIG. 1 is a block diagram of a device status indicator system.

Referring particularly to FIG. 1, a block diagram of a device status indicator system 101 of the present invention is shown. The devices status indicator system 101 comprises a hand held remote control device 109, device status indicator 104, 106, 107, and device 103, 111, 112. In the alternative, a smart control device 110 can be used with or without a hand held remote control device 109. The device status indicator 104, 106, 107 comprises a sensor that is attached to a device 103, 111, 112. It monitors the output of the device 103, 111, 112 looking for a signal. The remote control device 109 can be a handheld remote for example the Monster AVL300 or a separate control system. The command functions originate in the handheld remote control device 109. Command functions may be triggered by an event at a device 103, 111, 112. For example, turning on the DVD player 111 causes a command function to be triggered to signal the television 112 to be turned on. A status display could be on any device with access to the status signals. For example, the handheld remote 109, sensors 101, external display are all possible depending on the system application and user desires. A smart control device 110 is able to track previous states and actions and determine specific sets of actions to cause a specific result. It can either operate with an open loop controller or it could have previous knowledge of the state of the devices 103, 111, 112 and other factors of the environment before determining the necessary actions to perform.

FIG. 1 illustrates, an exemplary device status indicator system 101 that senses the state or status of a cable box 103, a DVD player 111 and a television 112 in a remote controlled system. Device 103, 111, 112 are merely exemplary and not intended to limit the present invention to only those devices 103, 111, 112.

In further detail, FIG. 1 illustrates, a device status indicator system 101 that is comprised to sense the state or status of a cable box 103 in a remote controlled system.

When the cable box 103 is turned ON in the remote controlled system, the device status indicator 104 will send a signal 102 to the remote control device 109 and/or the smart control device 110. This signal 102 triggers information to be stored in the remote control device 109 and/or the smart control device 110 that indicates that the cable box 103 is in an ON state.

When the cable box 103 is turned OFF in the remote controlled system, the device status indicator 104 will send a signal 102 to the remote control device 109 and/or the smart control device 110. This signal 102 triggers information to be stored in the remote control device 109 and/or the smart control device 110 that indicates that the cable box 103 is in an OFF state.

In more detail, FIG. 1 illustrates a device status indicator system 101 that is comprised to sense the state or status of a DVD player 111 in a remote controlled system.

When the DVD player 111 is turned ON in the remote controlled system, the device status indicator 107 will send a signal 108 to the remote control device 109 and/or the smart control device 110. This signal 108 triggers information to be stored in the remote control device 109 and/or the smart control device 110 that indicates that the DVD player 111 is in an ON state.

When the DVD player 111 is turned OFF in the remote controlled system, the device status indicator 107 will send a signal 108 to the remote control device 109 and/or the smart control device 110. This signal 108 triggers information to be stored in the remote control device 109 and/or the smart control device 110 that indicates that the DVD player 111 is in an OFF state.

In further detail, FIG. 1 illustrates, a device status indicator system 101 that is comprised to sense the state or status of a television 112 in a remote controlled system.

When the television 112 is turned ON in the remote controlled system, the device status indicator 106 will send a signal 105 to the remote control device 109 and/or the smart control device 110. This signal triggers information to be stored in the remote control device 109 and/or the smart control device 110 that indicates that the television 112 is in an ON state.

When the television 112 is turned OFF in the remote controlled system, the device status indicator 106 will send a signal 105 to the remote control device 109 and/or the smart control device 110. This signal triggers information to be stored in the remote control device 109 and/or the smart control device 110 that indicates that the television 112 is in an OFF state.

Figure 2:
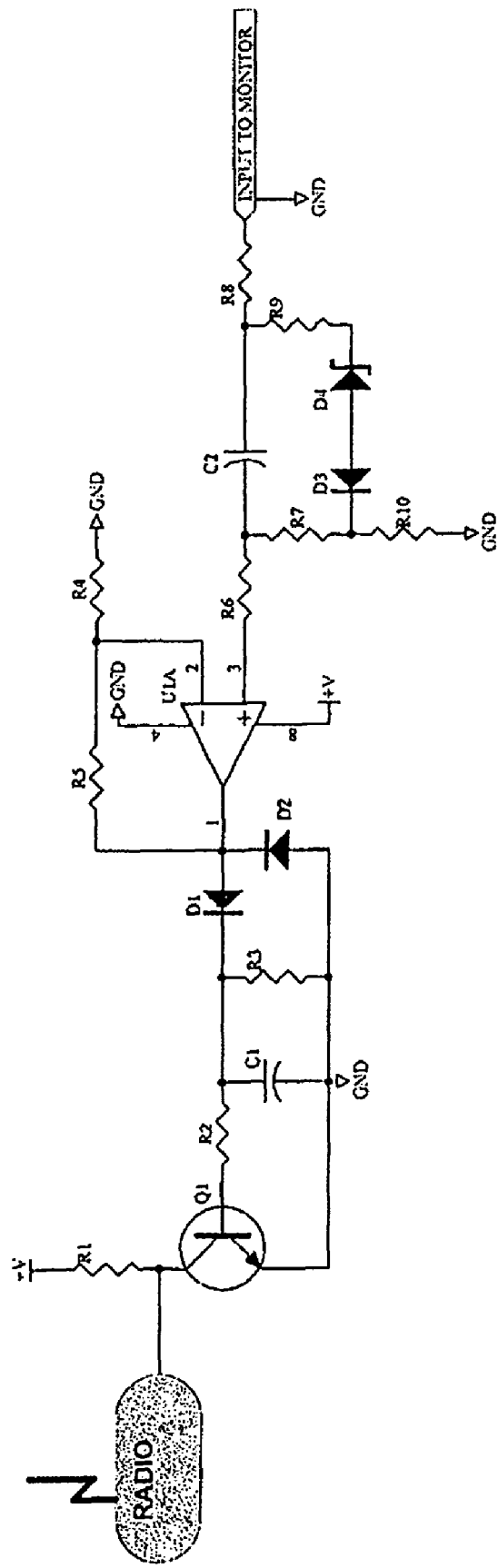
FIG. 2 is a circuit schematic for the state sensing of a signal for a device status indicator system.

Referring particularly to FIG. 2, a circuit schematic for the state sensing of a signal for a device status indicator system is shown. The circuitry of the schematic shows the detailed design of the state sensing of a signal. The output signal, for example, may be a video signal, audio signal, data signal or media signal, but not limited to. For transmission of the signal, the block radio indicator may be one of various types of radio technologies.

Figure 3:
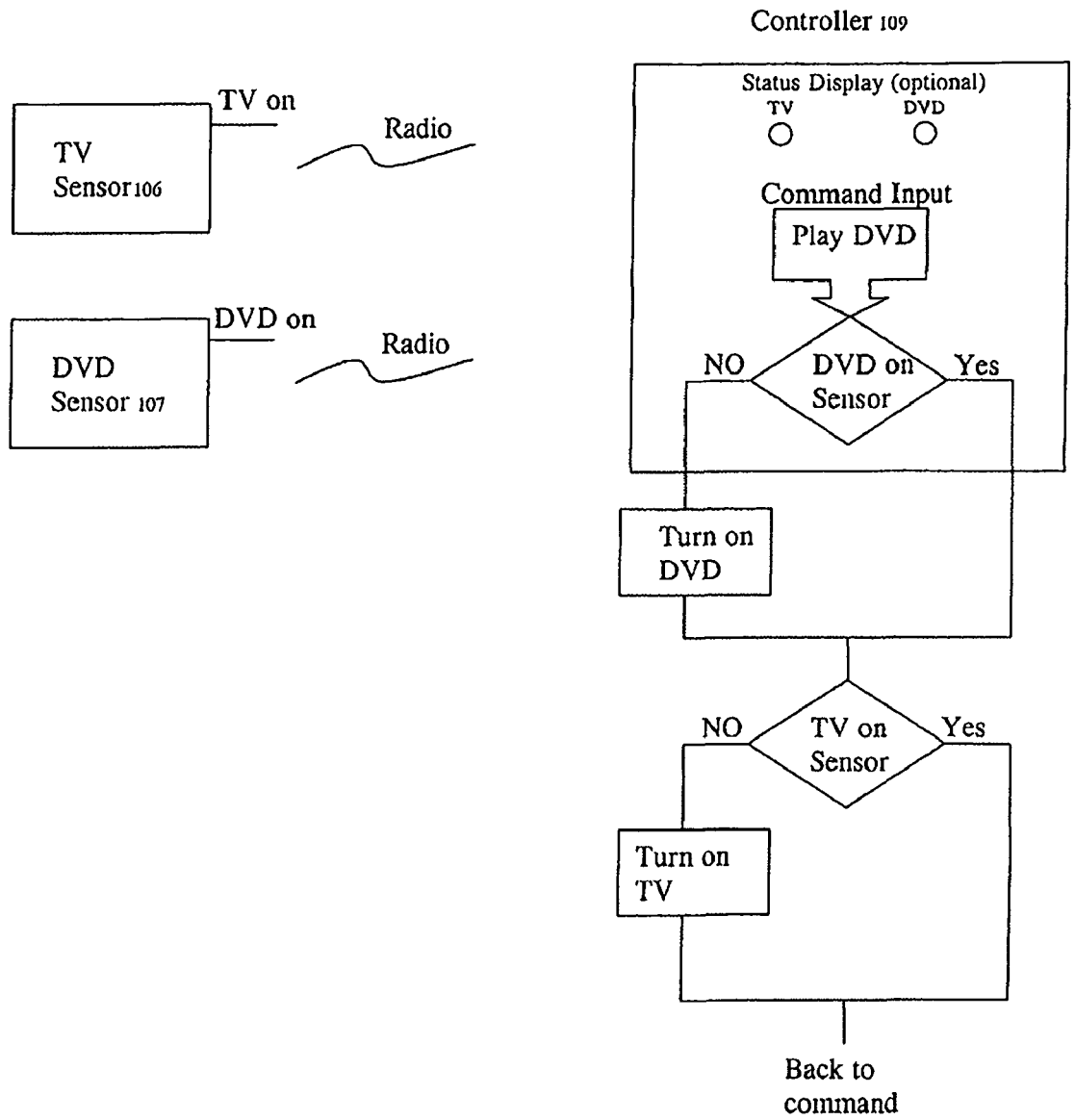
FIG. 3 is a block diagram of a controller handling a play DVD command.

Referring particularly to FIG. 3, a block diagram exemplifies how a controller 109 would handle a "play DVD" command. The command would originate in the controller 109, for example the command input would be "play DVD". The controller would transmit a signal to the sensor 107 on the DVD player 111. The test sensor 107 will respond "yes" or "no". Depending on the operating mode, a command could then be issued to "turn on DVD player". Next a signal is then transmitted to the television sensor 106. The sensor 106 relays back the operating mode and depending on the answer it may turn on the television. The transmission would occur in an open loop arrangement.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

We claim:

1. A system for indicating the on/off status of a first electronic device, wherein the first electronic device is connected to a second electronic device via an electronic connection, the system comprising:
    a. a device status indicator comprising at least one sensor that monitors external electronic output of the first electronic device, and wherein the device status indicator is connected in series on the electronic connection between the first and second electronic devices, and wherein the sensor is:
        i. in electronic communication with the first electronic device;
        ii. external to the first and second electronic devices; and
        iii. wherein the sensor monitors electronic signal output of the first electronic device;
    b. a processor that processes the electronic signal output sensed by the sensor;
    c. a transmitter that transmits the processed electronic signal output, including the on/off status of the first electronic device, to a remote control; and
    d. a remote controller that controls the first electronic device.

2. A system as recited in claim 1, further comprising: a smart control device in communication with the device status indicator and the electronic devices, wherein the smart control device is arranged to transmit a command signal to the electronic devices to change their operating mode status.

3. A system as recited in claim 2, wherein the command signal is wirelessly transmitted by way of a wireless smart control device to the electronic devices.

4. A system as recited in claim 1, wherein the electronic devices are consumer electronic products selected from a group comprising: a media player, a DVD player, a television, a cable box.

5. A system as recited in claim 1, wherein the remote controller includes a display screen suitable for displaying images and text.

6. A system as recited in claim 2, wherein the operating mode status of the first electronic device is displayed as text on the display screen.

7. A device status indicator, comprising:
 a. a sensor for connecting to at least one electronic device, wherein the sensor:
  i. monitors electronic signal output of the at least one electronic device;
  ii. is external to each of the at least one electronic device; and
  iii. is configured to connect in series on an electronic connection between a plurality of electronic devices;
 b. a processor for processing the electronic signal output sensed by the sensor; and
 c. a communication interface for transmitting the processed signal output to a remote control device.

8. A device status indicator as recited in claim 7, wherein the processed signal output is the operating mode status of the at least one electronic device.

9. The device status indicator as recited in claim 7, wherein
 a. the transmitter of the processed signal output to the remote control devices is a wireless transmitter.

10. The device status indicator as recited in claim 7, wherein the processor for processing the signal output sensed by the sensor processes a computer executable program.

* * * * *